(12) United States Patent
Kitahara et al.

(10) Patent No.: US 8,134,736 B2
(45) Date of Patent: Mar. 13, 2012

(54) IMAGE DATA PROCESSING APPARATUS AND METHOD

(75) Inventors: Yoshinao Kitahara, Matsumoto (JP); Shoji Kojima, Chino (JP); Manabu Mukaiyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 862 days.

(21) Appl. No.: 12/231,514

(22) Filed: Sep. 2, 2008

(65) Prior Publication Data

US 2009/0059265 A1 Mar. 5, 2009

(30) Foreign Application Priority Data

Aug. 31, 2007 (JP) ................................. 2007-225065

(51) Int. Cl.
*G06K 15/00* (2006.01)
*G06F 15/00* (2006.01)
*G06F 3/12* (2006.01)
*G06K 1/00* (2006.01)
*G06K 9/00* (2006.01)
*G06K 9/32* (2006.01)

(52) U.S. Cl. ...... 358/1.16; 358/1.15; 358/1.9; 358/3.23; 358/474; 382/100; 382/298

(58) Field of Classification Search .................. None
See application file for complete search history.

(56) References Cited

U.S. PATENT DOCUMENTS

| | | | |
|---|---|---|---|
| 6,580,804 B1 * | 6/2003 | Abe | 382/100 |
| 6,728,425 B1 * | 4/2004 | Tokuyama et al. | 382/299 |
| 6,771,395 B1 * | 8/2004 | Kito | 358/474 |
| 7,719,723 B2 * | 5/2010 | Kitamura | 358/3.23 |
| 7,777,896 B2 * | 8/2010 | Ueda et al. | 356/601 |
| 7,864,355 B2 * | 1/2011 | Aiso et al. | 358/1.15 |
| 2007/0273908 A1 * | 11/2007 | Hoshii | 358/1.9 |
| 2008/0239351 A1 * | 10/2008 | Yada | 358/1.9 |

FOREIGN PATENT DOCUMENTS

| | | |
|---|---|---|
| JP | 2000-307875 | 11/2000 |
| JP | 2002-036636 | 2/2002 |
| JP | 2005-262651 | 9/2005 |
| JP | 2005-262651 A | 9/2005 |
| JP | 2005-262652 A | 9/2005 |
| JP | 2006-343922 | 12/2006 |

\* cited by examiner

*Primary Examiner* — Mark K Zimmerman
*Assistant Examiner* — Satwant Singh
(74) *Attorney, Agent, or Firm* — Nutter McClennen & Fish LLP; John J. Penny, V

(57) ABSTRACT

An image data processing apparatus including: a reader that reads image data included an image file from an external storage medium, the image data being variable-length coded data of image blocks The reader performs a first reading processing for reading the image data in an arrangement order thereof from a storage medium and the data processor performs a boundary information derivation processing based on the image data for obtaining boundary information representing a boundary in a data arrangement in the storage medium between the image data belonging to two image blocks located adjacent in the data arrangement in the storage medium and at mutually different positions in the sub scanning direction. The reader performs a second reading processing for reading the image data from the storage medium in an order determined based on the boundary information and saving them in the storage.

7 Claims, 13 Drawing Sheets

FIG. 4A: BLOCK ARRANGEMENT
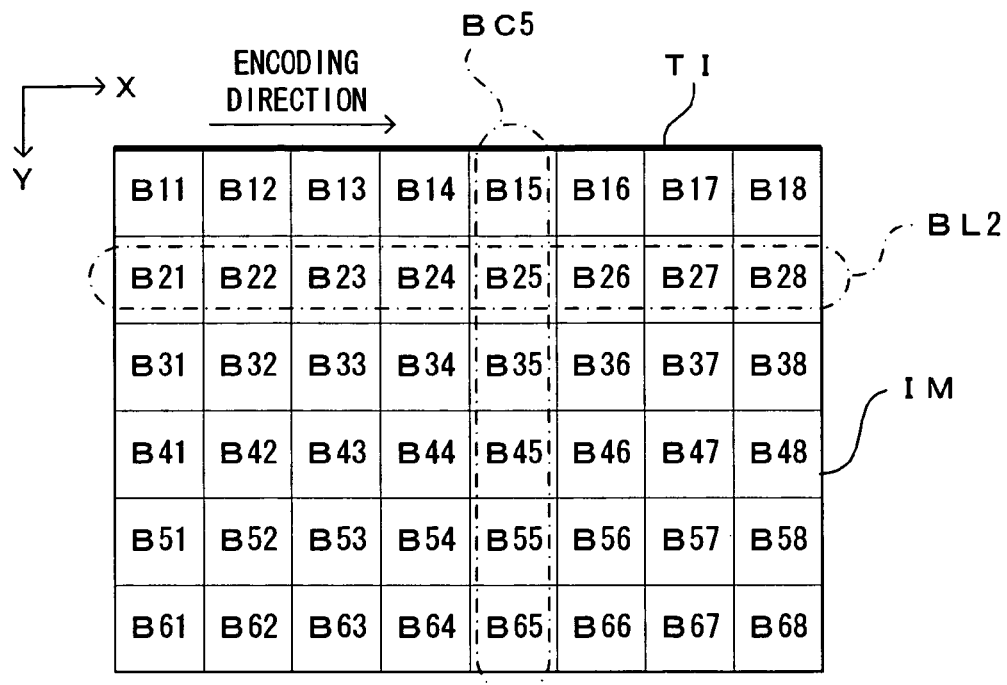
FIG. 4B: DATA ARRANGEMENT

FIG. 5A: DECODING ORDER
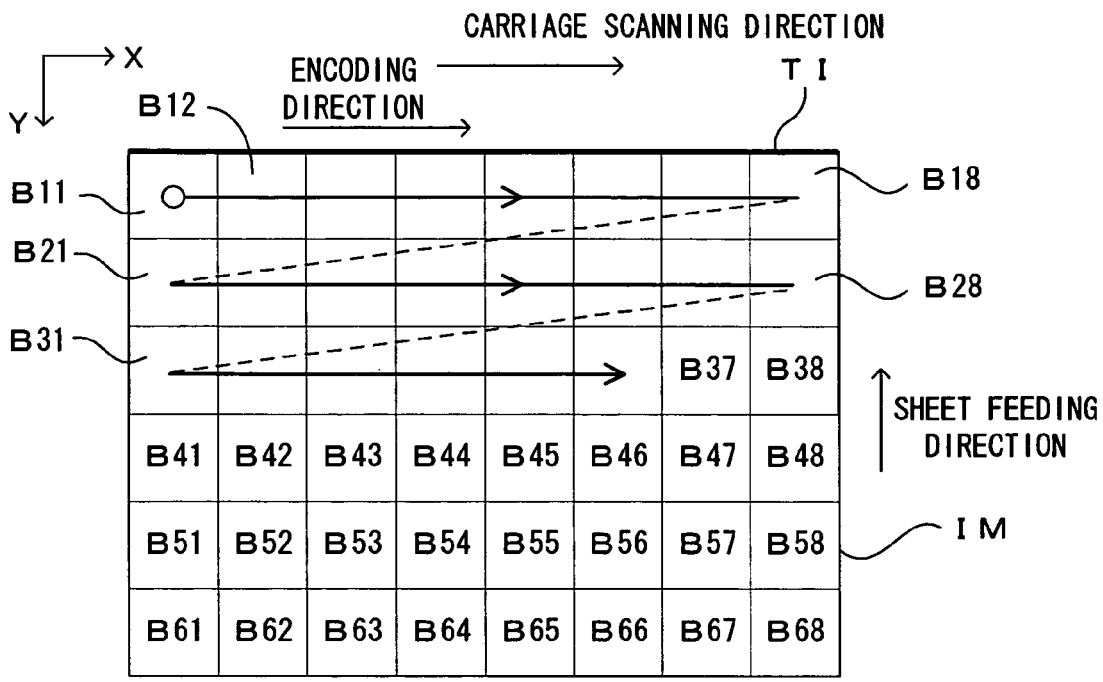
FIG. 5B: DATA IN BUFFER
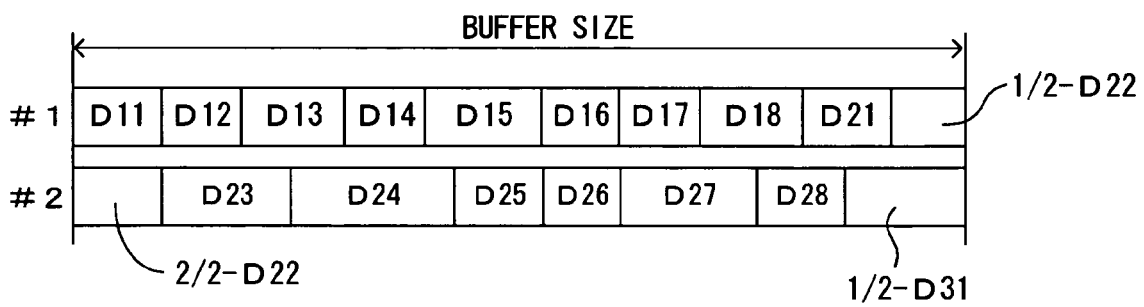

FIG. 6A: DECODING ORDER
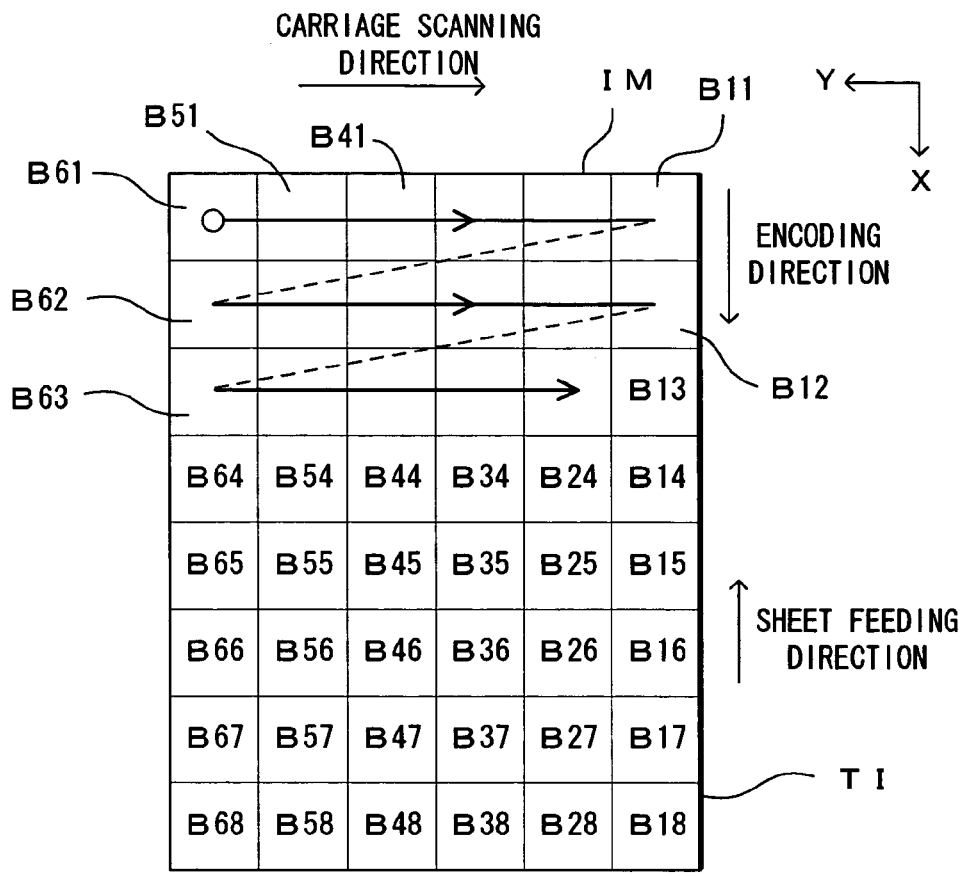
FIG. 6B: DATA IN BUFFER
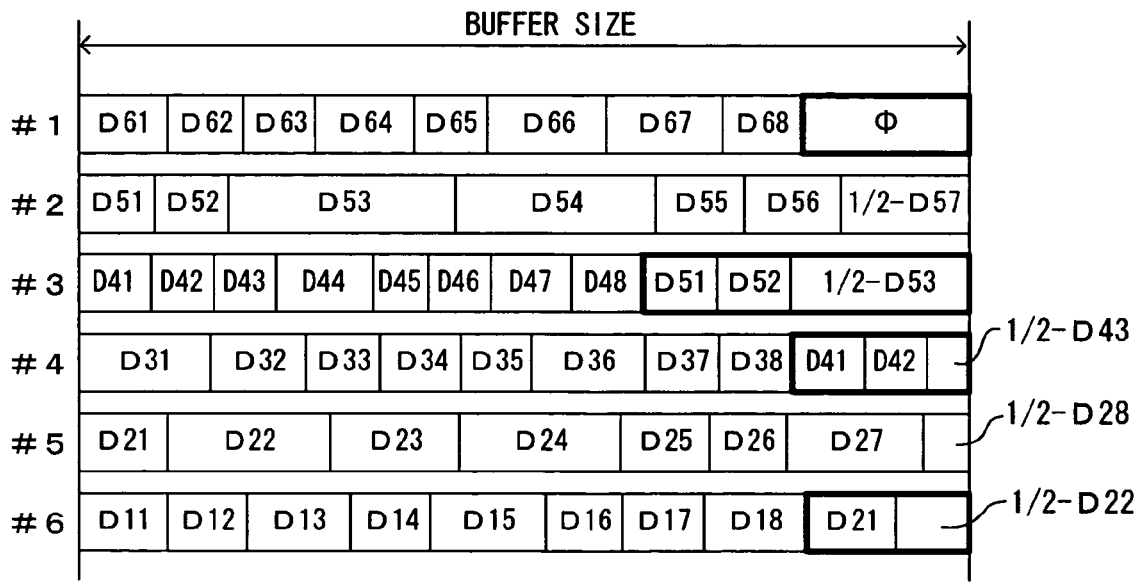

FIG. 9

| BLOCK NUMBER | OFFSET |
|---|---|
| B11 | 0 |
| B21 | 141 |
| B31 | 360 |
| B41 | 486 |
| B51 | 530 |
| B61 | 795 |

IMAGE DATA PROCESSING APPARATUS AND METHOD

CROSS REFERENCE TO RELATED APPLICATION

The disclosure of Japanese Patent Application No. 2007-225065 filed on Aug. 31, 2007 including specification, drawings and claims is incorporated herein by reference in its entirety.

BACKGROUND

1. Technical Field

The invention relates to an image data processing apparatus and an image data processing method for reading image data from a storage medium storing image files and processing the read data.

2. Related Art

An image data processing apparatus, which reads image data stored in an external storage medium and applies a data processing to the read image data, includes a storage for temporarily saving image data read from the storage medium to reduce the number of accesses to the storage medium. Image data necessary for data processing are read from the storage to be used for data processing when necessary. For example, in an image printing system disclosed in JP-A-2005-262651, when a user selects an image and its print condition to give a print instruction, the system starts requesting image data to an external storage medium such as a digital camera to obtain necessary data upon receiving the print instruction, generates print data from the obtained data and performs a printing operation.

In the case of reading image data from an external storage medium, it takes a longer time than the transfer of data in an apparatus. Thus, this image printing system includes a storage (cache buffer) for temporarily storing data read from the external storage medium.

SUMMARY

In the above conventional technology, since data readout from the external storage medium is started after a specified operation instruction is given from a user, there have been cases where it takes time to read necessary data and, as a result, a response to the user's instruction is delayed. Particularly, this problem is notable when the size of an image file stored in the external storage medium exceeds the capacity of the storage. This is because an operation of reading data necessary for processing from the external storage medium needs to be frequently performed since all the data cannot be stored in the storage.

An advantage of some aspects of the invention is to provide technology for shortening a data processing time in an image data processing apparatus and an image data processing method for reading image data from a storage medium storing image files and applying a data processing.

An image data processing apparatus according to an aspect of the invention comprises: a reader that reads image data included an image file from an external storage medium, the image data being variable-length coded data of image blocks obtained by dividing an image in a main scanning direction and a sub scanning direction and arranged in an order of the main scanning direction and the sub scanning direction; a storage that temporarily saves the image data read by the reader; a printing unit that prints the image corresponding to the image file on a recording material based on print data in response to a print instruction from a user; and a data processor that requests image data to the reader and performs a specified data processing to the image data fed from the reader in response to the request to generate the print data, wherein: the reader performs a first reading processing for reading the image data in an arrangement order thereof from the storage medium and the data processor performs a boundary information derivation processing based on the image data for obtaining boundary information representing a boundary in a data arrangement in the storage medium between the image data belonging to two image blocks located adjacent in the data arrangement in the storage medium and at mutually different positions in the sub scanning direction, whereas the reader performs a second reading processing for reading the image data from the storage medium in an order determined based on the boundary information and saving them in the storage; and at least one of the boundary information derivation processing and the second reading processing is started before receiving the print instruction from the user.

An image data processing method according to an aspect of the invention comprises: generating print data from image data stored in a storage medium and printing an image on a recording material based on the print data in response to a print instruction from a user; a first reading processing for reading image data included an image file in an arrangement order thereof from the storage medium storing, the image data being variable-length coded data of image blocks obtained by dividing an image in a main scanning direction and a sub scanning direction and arranged in an order of the main scanning direction and the sub scanning direction; a boundary information derivation processing for obtaining boundary information representing a boundary in a data arrangement in the storage medium between the image data belonging to two image blocks located adjacent in the data arrangement in the storage medium and at mutually different positions in the sub scanning direction based on the image data read in the first reading processing; and a second reading processing for reading the image data from the storage medium in an order determined based on the boundary information and saving them in the storage, wherein at least one of the boundary information derivation processing and the second reading processing is started before receiving the print instruction from the user.

In the following description, a strip-shaped part comprised of a plurality of image blocks of an image having the same position in a sub scanning direction, i.e. arranged in a line along a main scanning direction are called a "block row", whereas a strip-shaped part comprised of a plurality of image blocks having the same position in the main scanning direction, i.e. arranged in a line along the sub scanning direction is called a "block column". In this specification, an "image block, to which image data belongs" indicates an image block whose image content reflects information represented by the image data. In other words, the image data is the entirety or a part of data obtained by coding the image content of the image block.

In a variable-length coded image data string, the data length of image data corresponding to one image block differs depending on image content, wherefore it is difficult to read the image data by dividing them by the image block. Thus, the readout of image data from a storage medium tends to take a longer time particularly when an image data reading order differs from an arrangement order of the image data string in the storage medium. This is a factor of extending a data processing time.

In contrast, in the invention constructed as above, delimiters of the block rows in the image data string stored in the storage medium can be known by performing the first reading processing and the boundary information derivation processing. Accordingly, even if the image data reading order differs from the arrangement order of the image data string in the storage medium, the image data can be read within a relatively short period.

Further, since the readout of the image data is started after the print instruction is given according to the conventional technology, a printing processing is executed in following manner if the image data reading order differs from the arrangement order of the image data string in the storage medium. More specifically, the printing processing has been performed in such a procedure of obtaining boundary information if necessary after the print instruction is given, reading the image data in an order based on the boundary information and storing them in the storage, and generating print data. Thus, it takes a longer time until the print data are generated and a printing operation is actually performed.

On the other hand, in the invention, at least one of the boundary information derivation processing and the second reading processing for reading the image data from the storage medium in the order determined based on the boundary information and storing them in the storage is started before the print instruction is given from the user. Thus, when the print instruction is given from the user, at least the boundary information is already obtained even if the print instruction requires the data processing in an order different from the arrangement order of the image data string in the storage medium. Therefore, the successive operation of reading the image data from the storage medium can be efficiently performed within a short time. Further, if the image data had been already read in the order based on the boundary information when the print information was given, the print data can be immediately generated using these data, wherefore time up to the start of the printing operation can be drastically shortened.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 4A and 4B are diagrams showing an example of image data;

FIGS. 5A and 5B are diagrams showing an order of processing image data in the case of not rotating an image;

FIGS. 6A and 6B are diagrams showing an image data processing order in the case of not rotating an image;

FIG. 9 is a table showing an example of the boundary information;

DESCRIPTION OF EXEMPLARY EMBODIMENTS

Figure 1:
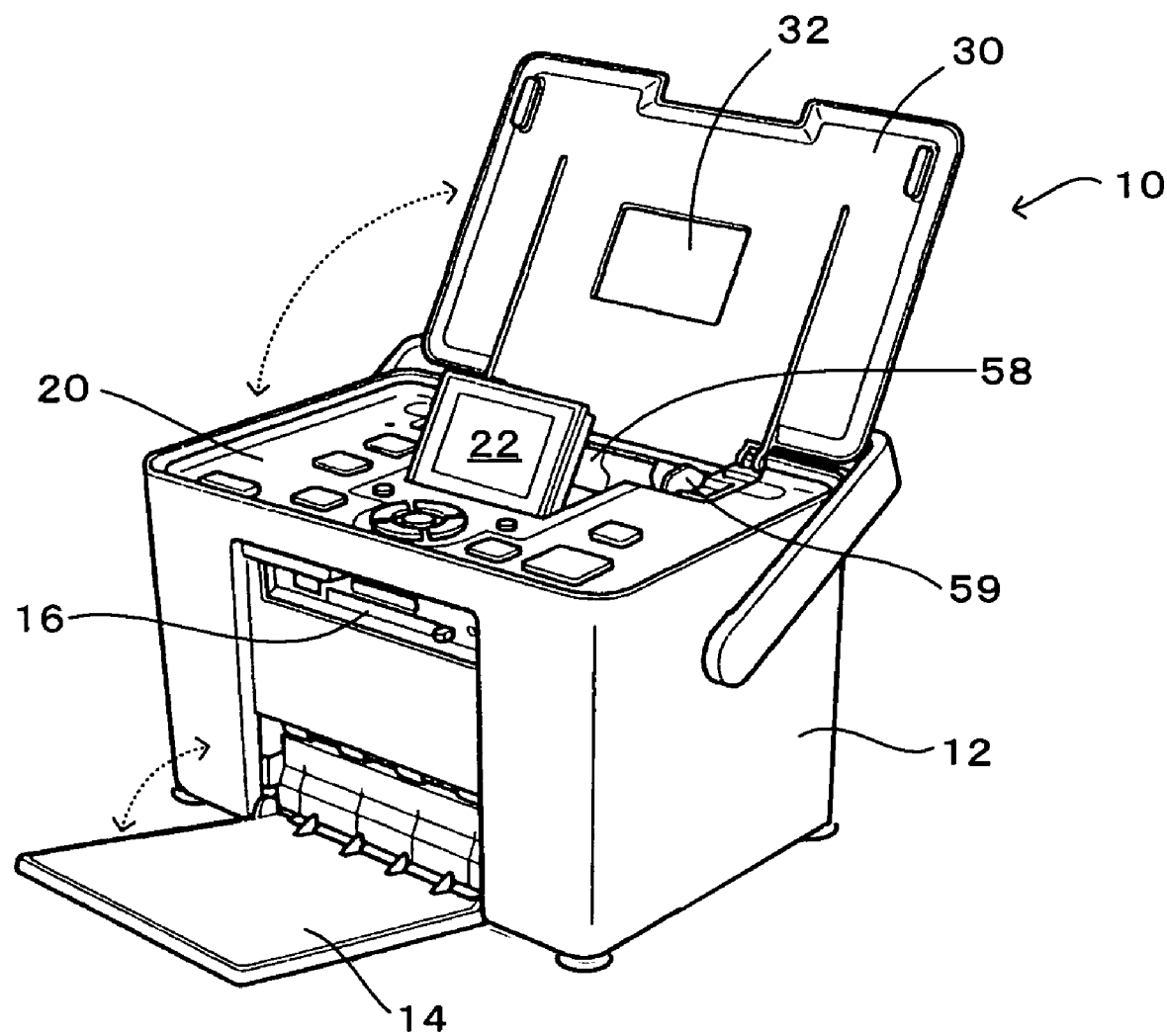
FIG. 1 is a perspective view showing a photo printer as an embodiment of an image data processing apparatus according to the invention.
Figure 2:
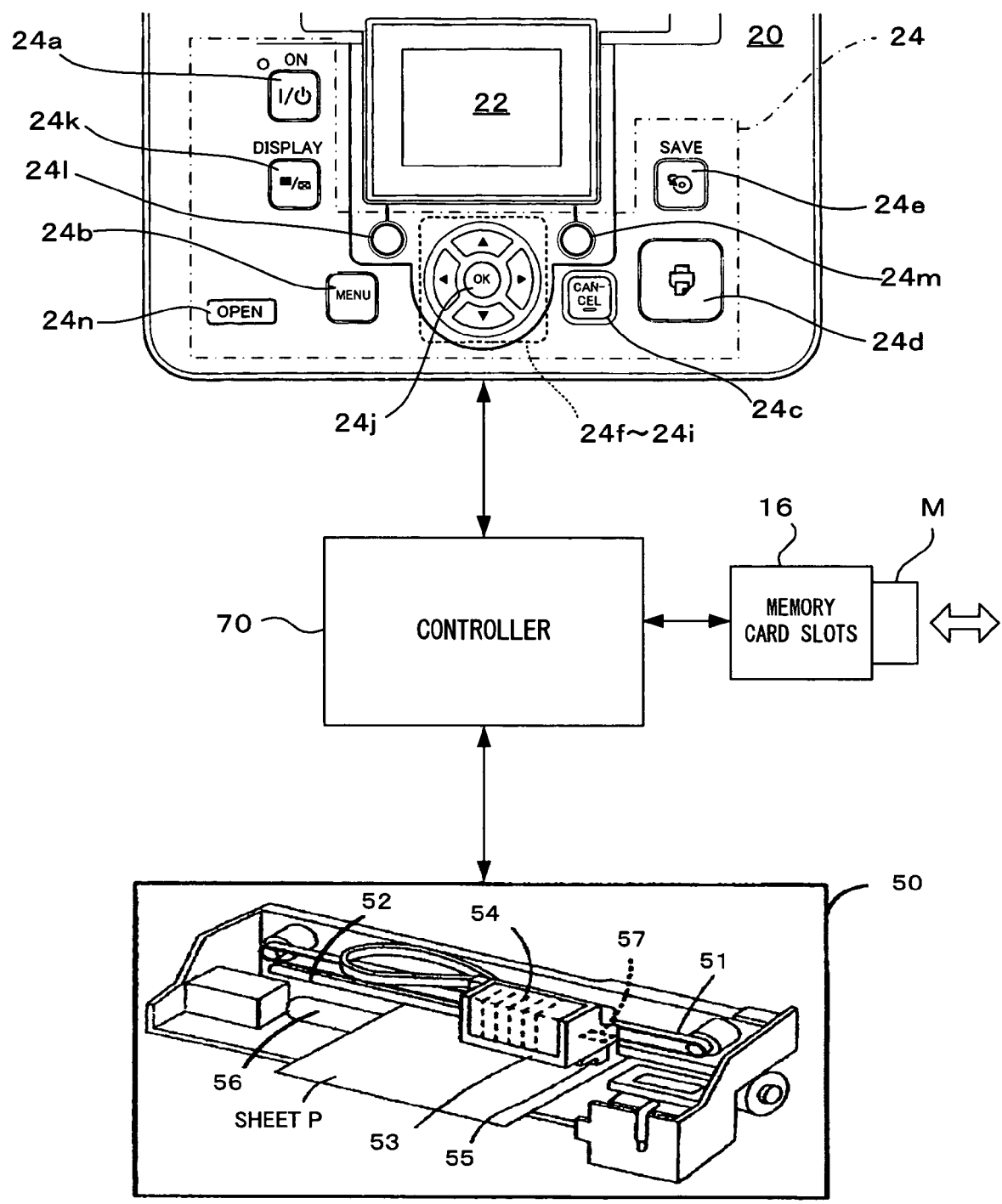
FIG. 2 is a diagram schematically showing the internal construction of the photo printer.

FIG. 1 is a perspective view showing a photo printer as an embodiment of an image data processing apparatus according to the invention, and FIG. 2 is a diagram schematically showing the internal construction of the photo printer. In this photo printer 10, a print mechanism 50 (see FIG. 2) is built in a printer body 12 and performs printing on a sheet P in accordance with an operation command from a controller 70 (see FIG. 2) for entirely controlling the photo printer 10. The thus printed sheet is discharged to the front side of the printer body 12.

As shown in FIG. 1, a front cover 14 is openably and closably mounted on the front surface of this printer body 12. This front cover 14 is for opening and closing the front surface of the printer body 12. In an open state, the front cover 14 functions as a discharge tray for receiving a sheet P discharged from the print mechanism 50 and a user can use various memory card slots 16 provided at the front surface of the printer body 12. In other words, the user can insert a memory card M storing image files to be printed into the memory card slot 16 in this state. External storage media storing image file data are not limited to memory cards, and may be USB (Universal Serial Bus) memories, disk media and the like. Further, digital cameras, mobile phones and other electronic devices storing images may be caused to function as external storage media by being connected with this photo printer 10 via communication utilizing cables or infrared rays.

An operation panel 20 is provided on the upper surface of the printer body 12, whereas a cover 30 is openably and closably mounted on the back side of the upper surface of the printer body 12. This cover 30 is a resin plate dimensioned to be able to cover the upper surface of the printer body 12 and exposes the outer surface of the operation panel 20 to the outside in an open state (see FIG. 1). On the other hand, if the cover 30 is closed, the entire operation panel 20 is covered.

This operation panel 20 includes an LCD screen 22 constructed, for example, by an LCD display for displaying characters, graphics, symbols, etc., and a button group 24 arranged around the LCD screen 22. As shown in FIG. 2, the button group 24 includes an on button 24a for turning power supply on and off, a display button 24b for calling a main menu screen, a cancel button 24c for canceling an operation halfway or interrupting a printing operation on the sheet P, a print button 24d for instructing the printing operation on the sheet P, a save button 24e for saving an edited image and the like in the memory card M inserted into the memory card slot 16, 4-way scroll buttons 24f to 24i operated to select a desired one from a plurality of options displayed on the LCD screen 22 and to move a cursor, an OK button 24j arranged in the center of the 4-way scroll buttons 24f to 24i for instructing the determination of the option selected by the 4-way scroll buttons 24f to 24i, a display button 24k for switching a screen displayed on the LCD screen 22, a left soft key 24l for selecting a left guide displayed on the LCD screen 22, a right soft key 24m for selecting a right guide displayed on the LCD screen 22, an open button 24n for opening the front cover 14 having a function as the discharge tray, etc.

For the confirmation of the displayed content of the LCD screen 22, the cover 30 is formed with a window 32 of the same size as the LCD screen 22. In other words, when the cover 30 is in a closed state, the user can confirm the displayed content of the LCD screen 22 through this window 32. On the other hand, when the cover 30 is in the open state, the LCD screen 22 can be adjusted to a desired angle as shown in FIG. 1.

When being set to the open state in this way, the cover 30 is held inclined backward relative to the operation panel 20 and can be used as a tray for feeding a sheet P to the print mechanism 50. A sheet feed portion 58 of the print mechanism 50 and a pair of edge guides 59 transversely slidable so as to adjust a guide width to the width of the sheet are provided at the back side of the operation panel 20.

A sheet P is fed into the print mechanism 50 through the sheet feed portion 58 to be printed. As shown in FIG. 2, in this print mechanism 50, a carriage 53 is driven by a timing belt 51 mounted in a looped state to transversely reciprocate along a guide 52. This carriage 53 includes an optical sensor 57 capable of detecting an end of a sheet P for detecting the left and right ends and the upper and lower ends of the sheet P. In other words, the optical sensor 57 enables the recognition of a sheet width by detecting the left and right ends of the sheet when the carriage 53 scans in a transverse direction before printing the sheet set in the sheet feed portion 58 and enables the recognition of a sheet length by detecting the rear end of the sheet during the printing.

Ink cartridges 54 for individually containing inks of cyan, magenta, yellow, black and other colors are mounted on this carriage 53. These ink cartridges 54 are respectively connected to a print head 55. The print head 55 injects the ink toward the sheet P from a nozzle (not shown) by applying pressure to the ink from the ink cartridge 54. In this embodiment, the print head 55 adopts a method of pressurizing the ink by applying a voltage to a piezoelectric element to deform this piezoelectric element. However, it is also possible to adopt a method of pressurizing the ink by bubbles generated by applying a voltage to a heating resistor (e.g. a heater) to heat the ink. The thus printed sheet P is discharged to the front cover (discharge tray) 14 in the open state by a sheet feed roller 56.

Although not shown, a battery pack can be mounted on the rear surface of the printer body 12, so that this printer 10 can operate on a battery even without being connected with a commercial power supply. Because of this point and another point that this printer 10 is a stand-alone printer usable without being connected with a host computer, this printer 10 is easily portable and usable anywhere.

Figure 3:
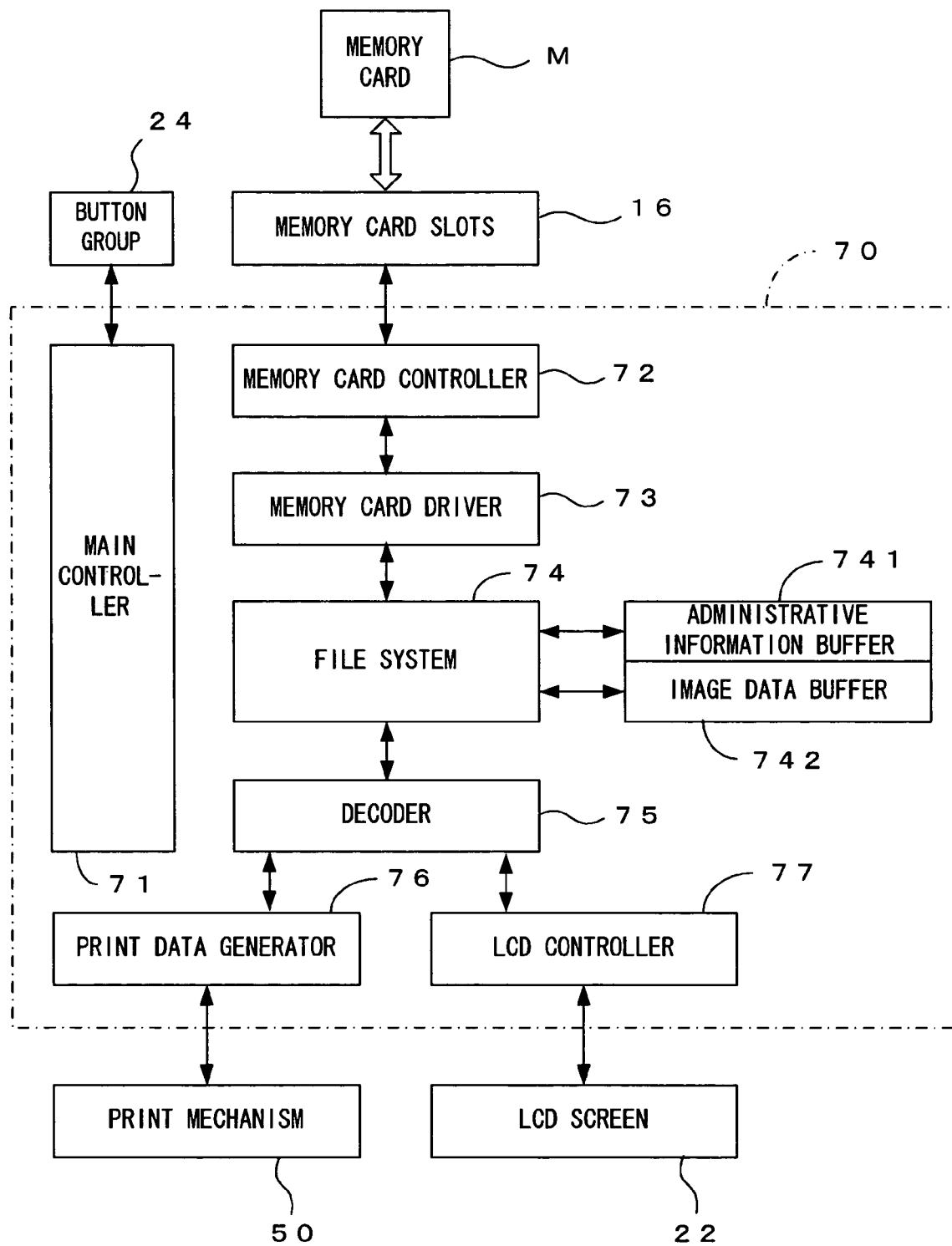
FIG. 3 is a block diagram showing the construction of a controller.

FIG. 3 is a block diagram showing the construction of a controller. As shown in FIG. 3, the controller 70 includes functional blocks such as a main controller 71, a memory card controller 72, a memory card driver 73, a file system 74, an administrative information buffer 741, an image data buffer 742, a decoder 75, a print data generator 76 and an LCD controller 77. Out of these, the respective functional blocks of the main controller 71, the memory card driver 73, the file system 74, the decoder 75 and the print data generator 76 are realized by software. In other words, these functions are realized by an unillustrated CPU executing a predetermined control program.

When a memory card M storing image files are inserted into the memory card slot 16 by the user, the memory card controller 72 detects it and accesses to a memory area of the memory card M to read stored data. Further, the memory card driver 73 controls the memory card controller 72 to read necessary data from the memory card M at specified timings.

The file system 74 saves the data read from the memory card M in the administrative information buffer 741 or the image data buffer 742 according to needs. The file system 74 further reads necessary data from the administrative information buffer 741 or the image data buffer 742 in response to a request from the decoder 75 to be described later and outputs a request for reading data from the memory card M to the memory card driver 73.

The decoder 75 decodes the data read from the memory card M and reconfigures the image file. At this time, if the image files stored in the memory card M are data-compressed, the decoder 75 decompresses the data to restore them into data before compression.

The print data generator 76 generates a print control signal based on the data of the image file decoded by the decoder 75 and outputs it to the print mechanism 50. The print mechanism 50 performs a printing operation based on the print control signal to form an image corresponding to the image file on a sheet. The LCD controller 77 generates a video signal based on the data of the image file decoded by the decoder 75 and outputs it to the LCD screen 22. In this way, the image corresponding to the image file is displayed on the LCD screen 22.

The main controller 71 controls the operation of the entire apparatus by monitoring statuses of the above respective parts and giving necessary control signals. The main controller 71 also receives the operation input of the user to the button group 24.

In the photo printer 10 constructed as above, a desired image is obtained by reading an image file stored in the memory card M, applying a necessary processing to generate print image data and operating the print mechanism based on the image data. However, since access to the memory card M as an external storage medium takes a longer time than the transfer of data in the printer, a longer time is required for printing if data necessary for printing are read from the memory card M every time. In order to avoid this problem, the administrative information buffer 741 and the image data buffer 742 are provided.

Both the administrative information buffer 741 and the image data buffer 742 are buffer memories for temporarily saving data, and save data and outputs saved data to the file system 74 in response to a request from the file system 74. Out of these, the administrative information buffer 741 saves directory information and FAT (File Allocation Table) information in the memory card M and information about what image data is stored in the image data buffer 742. The image data buffer 742 saves image data divided into clusters as data constituting the image file and stored in the memory card M. If data are saved in the buffer prior to the printing operation, a printing time can be shortened.

FIGS. 4A and 4B are diagrams showing an example of image data. Here, each image IM is divided into a plurality of image blocks in directions of orthogonal coordinate axes X, Y as shown in FIG. 4A, and a case of encoding the image content by the image block is thought. In an example of FIG. 4A, eight image blocks are arranged in an X-direction and six image blocks are arranged in a Y-direction in the image IM. Each image block is made up of a plurality of pixels arranged in vertical and horizontal directions. It should be noted that the number of the pixels constituting each image block and the number of the image blocks constituting the image are not limited to these and can be arbitrarily set. It is assumed that the respective image blocks are identified by assigning the corresponding coordinates as shown in FIG. 4A. For example, the left upper image block can be expressed by the coordinate (1, 1), and the block to the right of the former one can be expressed by the coordinate (1, 2). The other respective blocks can be similarly expressed. If the block expressed by the coordinate (m, n) needs to be indicated below, it is expressed using a symbol Bmn. For example, the left upper image block of the image IM corresponding to the coordinate (1, 1) is expressed by a symbol B11. In FIG. 4A, the upper edge of the image having a rectangular shape is expressed by a heavy straight line TI in order to facilitate the following description.

Strip-shaped image pieces, which are collections of the image blocks respectively arranged in a line in the X-direction and Y-direction, are called "block rows" and "block columns" below. For example, the image blocks B21, B22, B23, . . . , B28 horizontally arranged in a line along the X-direction constitute a block row BL2. Further, the image blocks B15, B25, B35, . . . , B65 vertically arranged in a line constitute a block column BC5.

On the other hand, image data as shown in FIG. 4B are included in an image file indicating such an image. Here, a symbol Dmn indicates image data representing the image content of the image block Bmn expressed by the coordinate (m, n). For example, a symbol D11 indicates image data corresponding to the left upper block expressed by the coordinate (1, 1). In the memory card M, image data D11 to D68 of the respective blocks are stored in the order of D11, D12, . . . , D18, D21, . . . , D67, D68. This does not mean that these data are stored as they are in this order in the clusters of consecutive numbers, but means that these data are stored in the above order in accordance with an order of cluster chains designated by a FAT file system. Similarly, when the arrangement order of the image data in the memory card is referred to in the following description, it means the order of data in accordance with the order of the cluster chain.

In the memory card M, the image data corresponding to the image blocks are encoded and arranged in an order of the X-direction (main scanning direction) and the Y-direction (sub scanning direction) in accordance with the arrangement of the image blocks in the image. Specifically, the image data representing the respective image blocks constituting the first (uppermost) block row are successively arranged from the leftmost image block in the leading end of the image file. In other words, the image data D11 representing the left upper image block B11 is firstly arranged and subsequently the image data D12 D13, . . . representing the image blocks B12, B13, . . . following in the X-direction are arranged. Following the data D18 representing the last (right end) image block B18 in the first row, the data D21 representing the image block B21 in the leading end (at the left end) of the second row is arranged. Similarly, the data are successively arranged from the left upper end of the image toward the right lower end.

If the image data are encoded by a compression method such as the JPEG method, the data lengths of the data Dmn representing the respective blocks Bmn are not fixed and differ depending on the image contents of the image blocks. Specifically, the image data shown in FIG. 4B are variable-length data. Accordingly, when the image IM shown in FIG. 4A is divided into six row images each having a height of one block and a width of eight blocks, the total data amount of the image data D11 to D18 corresponding to the block row made up of eight image blocks B11 to B18 and the total data amount of the image data D21 to D28 corresponding to the block row made up of eight image blocks B21 to B28 are, for example, not necessarily the same as shown in FIG. 4B.

In FIG. 4B, "offset" is a parameter indicating at which byte position the image data constituting the image file is located from the leading end of the image file. For example, an offset value "0" affixed to the side of the image data D11 representing the image content of the image block B11 indicates that the image data D11 starts from the leading end of the image file. Further, an offset value "141" affixed to the side of the image data D21 representing the image content of the image block B21 indicates that the image data D21 starts from the 141st byte from the leading end of the image file. Other offset values also indicate from which byte positions of the image file the image data corresponding to the respective image blocks start.

The decoder 75 specifies necessary data by this offset value upon requesting the image data to the file system 74. Specifically, the decoder 75 requests the data to the file system 74 by specifying the leading end position and the tail end position of the data by offset values. These positions can be specified by the offset value of the leading end of the data and the byte number or by the offset values of the leading end and the tail end. Upon receiving such a request, the file system 74 reads the data specified by the offset value(s) from the image file in the memory card M and writes them in the image data buffer 742.

Next, the flow of data processing upon reading an image file including such image data from the memory card M and printing an image corresponding to this image file on a sheet P using the print mechanism 50 will be described. Printing by the print mechanism 50 is performed by forming a band image of a specified width every time while the sheet P is conveyed in a specified direction at a specified sheet feed pitch and the carriage 53 is reciprocally moved to scan in a direction orthogonal to the specified direction. The band in this case is made up of at least one block row, and the band width corresponds to the width of a nozzle row arranged in the print head 55. Accordingly, for one scanning movement of the carriage 53, print data (band data) of at least one band needs to be fed from the decoder 75 to the print mechanism 50 via the print data generator 76.

In this embodiment, the decoder 75 decodes the image data by the block and supplies the decoded data to the print data generator 76. The print data generator 76 generates print data (band data) in band units by rearranging the decode data in block units into those in block row units and rearranging data in block row units into those in band units, and transmits a print control signal including the band data to the print mechanism 50, whereby the image is printed by the print mechanism 50.

(1) Case of not Rotating the Image

If an image is printed without being rotated, i.e. a scanning/moving direction of the carriage 53 coincides with the X-axis direction of FIG. 4A, an order of data requested by the decoder to the file system 74 for decoding coincides with an arrangement order of the image data in the memory card M. Accordingly, the decoder 75 may request the data from the leading one of the image file to the file system 74.

FIGS. 5A and 5B are diagrams showing an order of processing image data in the case of not rotating an image. More specifically, FIG. 5A is a diagram showing an order of image blocks to be decoded by the decoder 75 and FIG. 5B is a diagram showing an order of saving the image data in the image data buffer 742. In the case of not rotating the image, the image IM is printed downward from the upper edge TI thereof. Thus, the order of the image blocks to be decoded by the decoder 75, i.e. the decoding order, is from left to right and from top to bottom, i.e. an order of B11, B12, B13, . . . as shown by arrowed straight lines in FIG. 5A. Therefore, the order of data requested from the decoder 75 is the same as the arrangement order in the memory card M, i.e. an order of D11, D12, D13, . . . .

At this time, the image data read from the memory card M and written in the image data buffer 742 are read in the written order and transferred to the decoder 75 to be decoded. Accordingly, when the file system 74 reads the image data from the memory card M in response to the request from the decoder 75, it may collectively write the image data of a suitable data length including the requested image data in the image data buffer 742.

For example, when the decoding processing is started and the image data D11 corresponding to the first image block B11 is requested from the decoder 75, the file system 74 reads the data from the memory card M since no data is stored in the image data buffer 742. At this time, the successive data of a suitable length with the requested data D11 in the lead are read and written in the image data buffer 742. If it is assumed that the image data buffer 742 is made up of a plurality of line buffers having a predetermined buffer size, the length of the image data to be read can be, for example, set to the buffer size of the line buffers. The buffer size preferably has such a data length as to completely accommodate the image data of at least one image block.

In this case, as shown in FIG. 5B, the data D11, D12, . . . read from the memory card M are written in the line buffer #1 up to the maximum capacity of the buffer size. In the example shown in FIG. 5B, the data are written up to a part of the image data D22 corresponding to the block B22 in the line buffer #1. In FIG. 5B, a symbol 1/2-D22 indicates that the data D22 is not completely accommodated in the line buffer #1 and only the front half is written therein. This also applies below.

With the above arrangement, if the data D12, D13, . . . are successively requested form the decoder 75, the file system 74 can transfer the image data D12, D13, . . . written in the line buffer #1 to the decoder 75 without reading the data from the memory card M. If the decoding processing is completed for the first block row, i.e. the image blocks B11 to B18, the print data of one band are prepared. Therefore, a printing operation can be started for this band. Accordingly, if image data of one or more block rows are saved in one line buffer of the image data buffer 742 as shown in FIG. 5B, decoding and printing for this block row can be performed without any readout from the memory card M halfway. If the readout and decoding of data of the next block row are completed until printing of at least this block row is completed, the image can be printed within a short period of time by successively performing printing operations without delay.

Since only the first half of the data D22 is saved in the line buffer #1 when the data D22 is requested from the decoder 75, the file system 74 reads the successive data from the memory card M and writes them in another line buffer #2. In FIG. 5B, a symbol 2/2-D22 indicates the second half of the data D22. This also applies below. At this time, the successive data D23, D24, . . . are also written up to the maximum capacity of the buffer size. The image data of the respective image blocks are similarly processed and printed below.

As described above, in the case of not rotating the image, it is sufficient to provide at least one line buffer having a proper buffer size. When access is made to the memory card M in response to the request of the decoder 75, the image data corresponding to the buffer size are collectively read and saved in the line buffer, whereby the processing can be efficiently performed within a short time by reducing the number of read accesses to the memory card M. Although one block row and one band are described to have the same height here, a plurality of block rows frequently constitute one band in actual printing operations. In such cases, the readout of image data from the memory card M, the decoding and the printing operation based on band data after decoding can be smoothly performed if line buffers equal to or more than the number of block rows constituting one block are provided.

(2) Case of Rotating the Image

FIGS. 6A and 6B are diagrams showing an image data processing order in the case of rotating an image. More specifically, FIG. 6A is a diagram showing an order of image blocks to be decoded by the decoder 75 and FIG. 6B is a diagram showing an order of saving the image data in the image data buffer 742. In the case of printing an image while rotating it, for example, by 270° in a counterclockwise direction, the scanning/moving direction of the carriage 53 is the Y-direction, i.e. a column direction orthogonal to the arrangement order (X-direction) of the image data. Thus, an order of the image data to be printed is B61, B51, B41, B31, B21, B11, B62, B52, . . . , B18 as shown by arrowed straight lines in FIG. 6A and is opposite to the data arrangement order in the memory card M.

In the decoding processing in this case, the image data D61 corresponding to the image block B61 is first requested and the data including the image data D61 are accordingly read from the memory card M and written in the line buffer #1. At this time, if the image data having the data length corresponding to the buffer size are read as in the case of not rotating the image, the data D61 and the successive data D62, D63, . . . in the memory card M are written in the line buffer #1 as shown in FIG. 6B. A symbol $\phi$ in FIG. 6B indicates invalid data, which is not image data belonging to this image file.

After the image data D61 is read and decoded in this way, what is required next is the data D51. Since this data D51 is located before the previously requested data D61 in the arrangement in the memory card M, it is in no way included in the data read and written in the line buffer #1 together with the image data D61. Accordingly, new readout from the memory card M is necessary at this time. Similarly, when the data D41, D31, D21 and D11 are requested, they are read from the memory card M every time. As a result, data having the data length corresponding to the buffer size with the data D61, D51, D41, D31, D21 and D11 in the leads are respectively saved in the line buffers #1, #2, #3, #4, #5 and #6. The successive data read following these data are successively transferred to the decoder 75 in response to the request from the decoder 75.

This may cause the duplication of the read data in some cases. For example, if the data D51 is focused, this data is read from the memory card M again during the next readout and written in the line buffer #3 despite the fact that it was already read from the memory card M and written in the line buffer #2. Further, the data D51 saved in the line buffer #3 is already decoded for this image block and no longer necessary. Similarly, any of the data enclosed in heavy-line frames in FIG. 6B is data originally unnecessary to read because it is already read or not used for the processing.

The readout of such unnecessary data is inefficient because time required for the readout is wasted, the processing time is extended and the storage resource of the image data buffer 742 is wasted. In this embodiment, as described below, the efficiency of the processing is improved and the processing time is shortened by prohibiting the readout of the unnecessary data enclosed in the heavy-line frames in FIG. 6B. In other words, in this embodiment, the controller 70 performs the following operation when the memory card M is inserted into the memory card slot 16.

Figure 7:
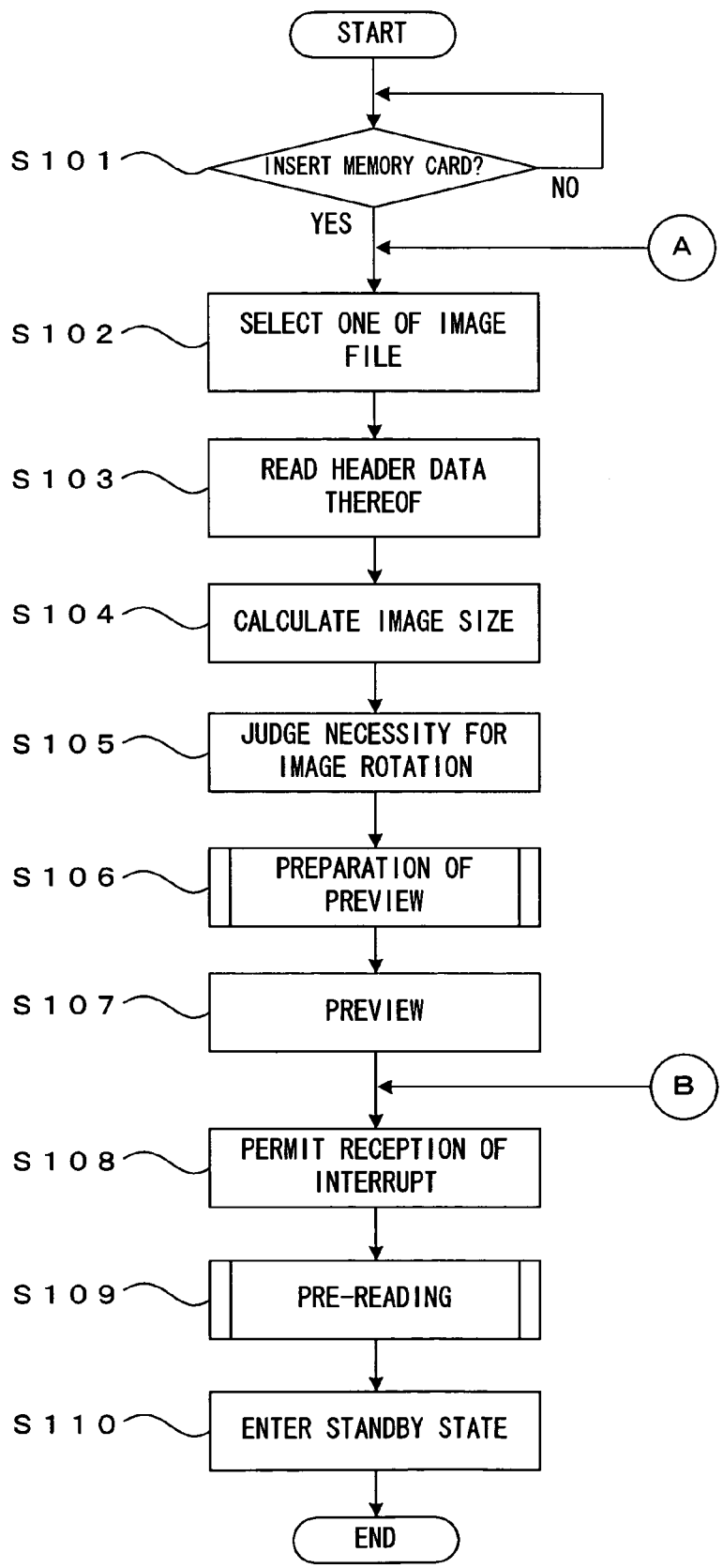
FIG. 7 is a flow chart showing the operation at the time of inserting the memory card.

FIG. 7 is a flow chart showing the operation at the time of inserting the memory card. If the insertion of the memory card M into the memory card slot 16 is recognized (Step S101), the file system 74 selects one of image files stored in the memory card M, e.g. the first one in the arrangement order, by means of the memory card driver 73 and the memory card controller 72 and reads the header data thereof (Steps S102, S103).

If the image file is of the data format such as the JPEG format, the image file includes data called EXIF header data which includes information relating to the image such as the numbers of pixels of the image in the vertical and horizontal directions and imaging conditions. Based on this information, the decoder 75 calculates the size of the image (pixel numbers in the vertical and horizontal directions) (Step S104) and judges whether or not it is necessary to rotate the image (Step S105). This judgment is made as follows. From the size of the image, the orientation of the image, i.e. whether the image is vertically long or horizontally long, can be known. The rotation is judged to be unnecessary if the orientation of the image is the same as that of a sheet P while being judged to be necessary if the two orientations differ. In this way, an order of image data to be requested from the decoder can be predicted from the information on the size of the image. If the image layout such as the orientation of the image and the allotment of a plurality of images to one sheet P is additionally specified by a user, such a specification may be prioritized. In other words, the order of the image data to be requested from the decoder 75 can also be predicted from the information on the user instruction relating to the image layout. Subsequently, a preview preparation processing for displaying (preview) the selected image on the LCD screen 22 is performed.

Figure 8:
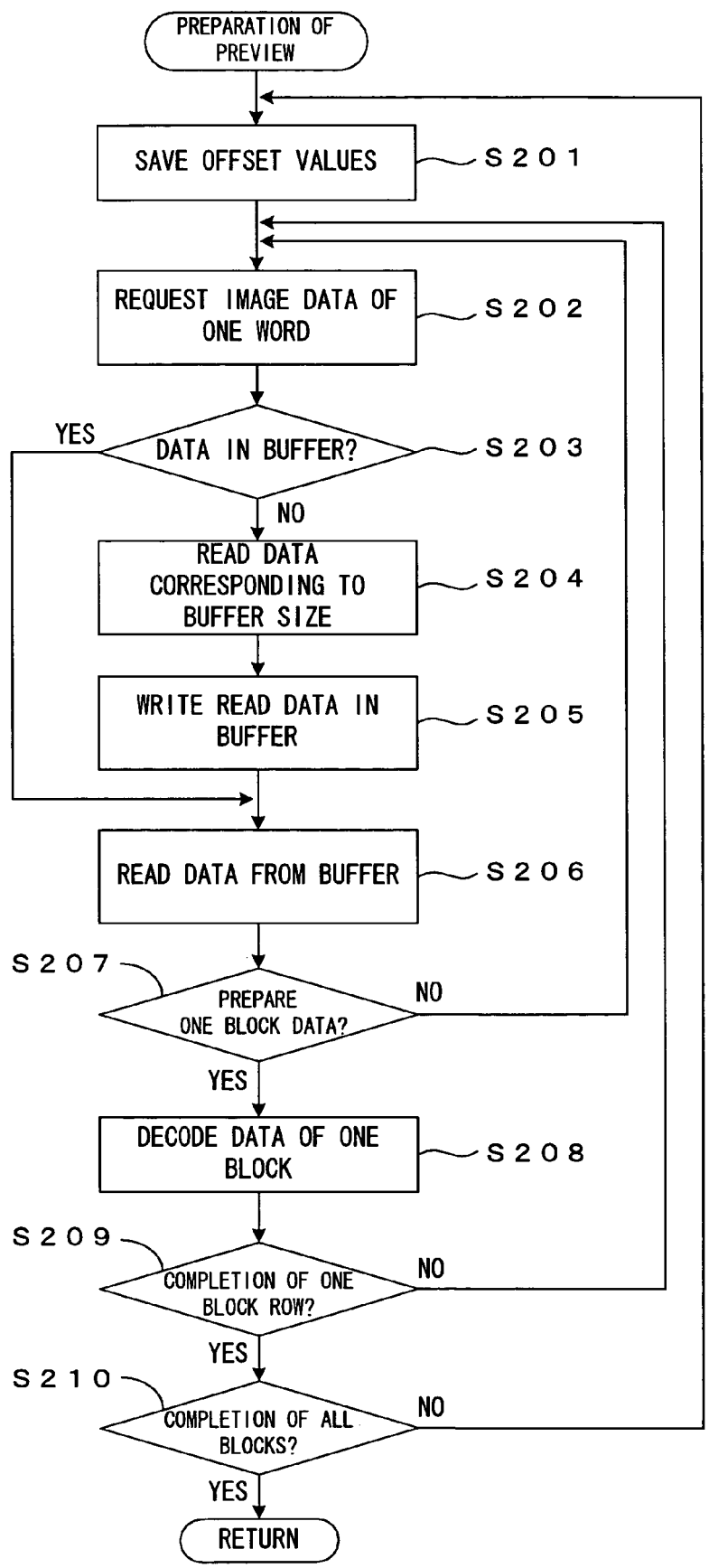
FIG. 8 is a flow chart showing the preview preparation processing.

FIG. 8 is a flow chart showing the preview preparation processing. In the preview preparation processing, the offset values of the image data being presently processed are saved in the administrative information buffer 741 (Step S201). The offset value is 0 at a processing starting point. Subsequently, the decoder 75 requests the image data of one word to the file system 74 (Step S202). Here, the length of one word arbitrarily changes depending on the image content, and this is done, for example, by specifying the offsets of the data in the leading end and the tail end.

Upon receiving the request, the file system 74 judges whether or not all the requested image data are already read and saved in the image data buffer 742 based on the information saved in the administrative information buffer 741 (Step S203). Unless at least some of the requested image data are saved in the image data buffer 742, data having the data length corresponding to the buffer size are read from the memory card M with this data in the lead and written in the image data buffer 742 (Steps S204, S205). If there is no empty line buffer in the image data buffer 742, the data are overwritten in the line buffer, in which the data were first written, out of the already written line buffers. In this way, the necessary image data are saved in the image data buffer. Accordingly, the file system 74 reads the requested image data from the image data buffer 742 and feeds them to the decoder 75 (Step S206).

The decoder 75 repeats the data request to the file system until the data of one image block are prepared (Step S207). Whether or not the data of one block have been prepared can be judged based on whether or not the fed data include an identification code indicating the tail end of the block. If the data of one block are prepared, these data are decoded and the image information is restored by the pixel of this image block (Step S208).

The above processing is repeated until all the blocks are completed (Step S210). Every time the processing for one block row is completed (Step S209), this routine returns to Step S201 and the offset values of the image data at that time are saved in the administrative information buffer 741. These values are the offset values of the image data D11, D21, . . . corresponding to the blocks B11, B21, . . . at the left ends of the respective block rows of the image shown in FIG. 4A and indicate boundaries between one block row and the next block row in the data arrangement in the memory card M. A set of these offset values indicating the left ends of the respective block rows will be called "boundary information" below.

FIG. 9 is a table showing an example of the boundary information. This boundary information corresponds to the image illustrated in FIGS. 4A and 4B. For example, the block B11 is located at the left end for the first (uppermost) block row and the offset of the image data D11 corresponding thereto is 0. Further, the block B21 is located at the left end for the second block row and the offset of the image data D21 corresponding thereto is 141. This similarly applies also for the following respective block rows. Although the numbers of the blocks located at the left ends of the respective block rows and their offset values are shown in pairs in FIG. 9 to facilitate the description, the offset values indicating the left ends of the respective block rows are essential as the boundary information, but the block numbers are not particularly necessary. When another image file is selected by the user, the old boundary information is deleted and that of the newly selected image file is saved in the administrative information buffer 741.

Referring back to FIG. 7, when the preview preparation processing (Step S106) is completed as above, all the contents of the selected image file are decoded into pixel information. Accordingly, the image is previewed on the LCD screen 22 based on the thus decoded information (Step S107). More specifically, the data decoded by the decoder 75 are fed to the LCD controller 77 and the LCD controller 77 generates display data from the received data and feeds it to the LCD screen 22, whereby the image corresponding to the image file is displayed on the LCD screen 22. In this way, the user can confirm the content of the selected image on the screen.

At this point of time, the controller 70 permits the reception of an interrupt processing (Step S108), thereby causing the apparatus to enter a state where a new instruction operation from the user can be received. Then, a pre-reading processing to be described next is performed (Step S109) to enter a standby state of waiting on standby until an operation is given from the user (Step S110). The pre-reading processing is a processing for reading data from the memory card M and saving them in the image data buffer 742 beforehand without waiting for the instruction operation so as to quickly respond to the instruction operation given from the user after enabling interrupt.

Figure 10:
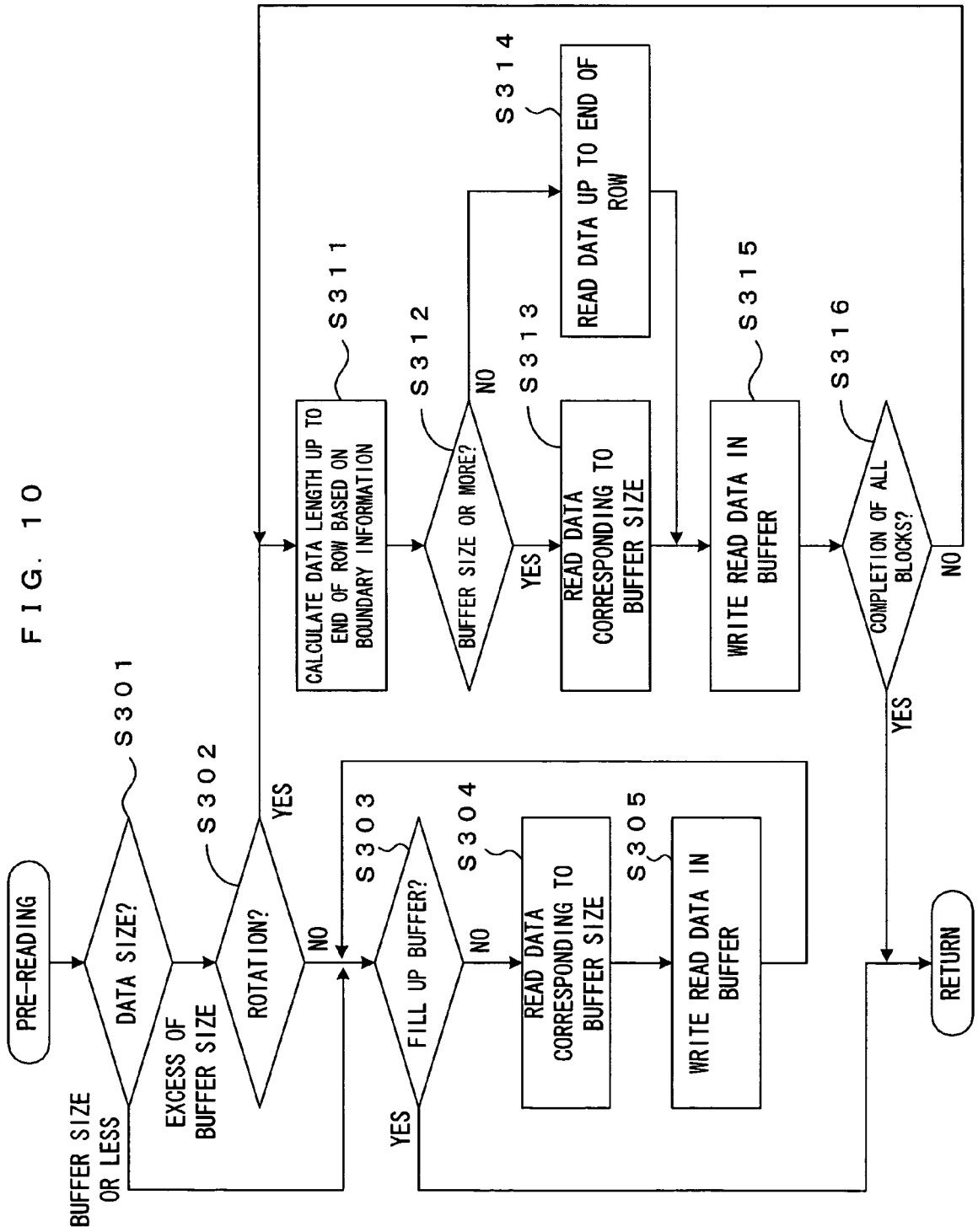
FIG. 10 is a flow chart showing the pre-reading processing.

FIG. 10 is a flow chart showing the pre-reading processing. In this processing, the data size of the image file is judged based on the information already read from the memory card M by the processing thus far (Step S301). If the data size exceeds the capacity of the image data buffer 742, it is successively judged whether or not the image needs to be rotated for the processing (Step S302). This judgment criterion is as already described.

A processing (Steps S301 to S305) in the case where the data size of the image file is equal to or below the capacity of the image data buffer 742 and in the case where the data size exceeds the capacity of the image data buffer 742, but the rotation is unnecessary will be first described. In these cases, the image data are read from the memory card M and saved in the image data buffer 742 until filling up the image data buffer 742 or until all the image data constituting the image file are read. Specifically, a data written state in the image data buffer 742 is judged (Step S303), and the pre-reading processing is ended if the image data buffer 742 is already filled up or the readout of all the image data of this image file is already completed, whereas the processing of reading the data having the data length corresponding to the buffer size from the memory card M (Step S304) and writing them in the image data buffer 742 (Step S305) is repeated unless otherwise.

In the above preview preparation processing, the data are written in the image data buffer 742 in the order conforming to the arrangement order in the memory card M. Accordingly, in the pre-reading process performed immediately thereafter, there could be also cases where the readout of new image data is unnecessary.

In this way, the image data are successively saved in the image data buffer 742 in the order conforming to the arrangement order in the memory card M as shown in FIG. 5B. As a result, if the data size of the image file is equal to or below the capacity of the image data buffer 742, all the image data included in this image file are saved in the image data buffer 742. Further, if the data size exceeds the capacity of the image data buffer 742 but the rotation is unnecessary, the image data are saved until filling up the image data buffer 742. Thus, printing can be performed without delay using the data saved in the image data buffer 742, for example, when a printing operation is instructed by the user. As described above, in this embodiment, by reading the image data from the memory card M and saving them in the image data buffer 742 without waiting for an instruction from the user, a processing time required for the printing can be drastically shortened as compared to the conventional apparatus for starting the readout from the memory card M in response to an instruction from a user.

Next, a processing (Steps S311 to S316) in the case where the data size of the image file is larger than the capacity of the image data buffer 742 and the rotation is necessary will be described. In this case, all the image data cannot be saved in the image data buffer 742 and the order of the data requested by the decoder 75 differs from the data arrangement order in the memory card M as described above. Thus, the saving of the image data in the image data buffer 742 in conformity with the arrangement order in the memory card M does not lead to the shortening of the printing time. Accordingly, the following arrangement is made.

First of all, for the image block (left upper block B61 in the example of FIG. 6B) to be first decoded, the data length from the leading end of the image data representing this image block to the tail end of the image data representing the image block in the same block row as this image block is calculated (Step S311). In the example of FIG. 6A, six blocks B61, B62, B63, B64, B65 and B66 constitute one block row (see FIG. 4A). Accordingly, the total data length of the data D61 to D68 corresponding to these is a value to be calculated. Here, the offset of the data D61 seen from the leading end of the image file is known from the previously obtained boundary information (FIG. 9). Further, the tail end of the data D68 is known from the total data size of the image file. In other words, since the leading end position and the tail end position of the image data of this block row in the image file are known, the data length of the image data in this block row can be calculated from these pieces of information. Since the leading end and tail end positions of the data are represented by the boundary information for the other block rows, the data lengths can be calculated.

The calculated data length and the buffer size of one line buffer are compared (Step S312) and the data having the data length corresponding to the buffer size are successively read from the leading data D61 from the memory card M and saved in the image data buffer 742 (Steps S313, S314) if the data length is equal to or above the buffer size. On the other hand, if the calculated data length is below the buffer size, only the data of the calculated data length are read from the leading data D61 from the memory card M (Step S314) and saved in the image data buffer 742 (Step S315). The above processing (Steps S311 to S315) is repeated for all the block rows (Step S316).

Since the total data length of the data D61 to D68 is below the buffer size in the example of FIG. 6B, only the data of this total data length are read from the memory card M and written in the line buffer #1. Thus, there is no likelihood of reading the invalid data indicated by the symbol φ in FIG. 6B. Further, for the block row starting from the image block B51, the total data length of the image data D51 to D58 representing the image blocks B51 to B58 included in this block is above the buffer size. Thus, only the image data (D51 to 1/2-D58) of the buffer size are read from the memory card M and saved in the line buffer #2. For the block row starting from the image block B41, the total data length of the image data D41 to D48 representing the image blocks B41 to B48 included in this block is equal to or below the buffer size. Thus, only the image data of the total data length are read and saved in the line buffer #3.

By doing so, the readout of the data, which need not be read, i.e. the data enclosed in the heavy-line frames in FIG. 6B, is eliminated. As a result, in this embodiment, time conventionally required for the readout of unnecessary data can be shortened to shorten the entire processing time. Further, since there is no likelihood of doubly saving the same data in the image data buffer 742, the storage resource can be effectively utilized. For example, the buffer capacity can be more effectively utilized if the buffer sizes of the line buffers can be individually set and conform to the total data lengths of the respective block rows.

Further, the image data are read from the memory card M in a mode suitable for the processing and saved in the image data buffer 742 beforehand without waiting for an instruction from the user and on the premise of rotating the image. Therefore, the processing time required for the printing can be drastically shortened as compared to the conventional apparatus for starting the readout from the memory card M in response to an instruction from a user.

In this embodiment, the data length of the image data to be read from the memory card M is restricted to the buffer size when the total data length from the leading end to the tail end of one block row exceeds the buffer size. By doing so, the storage capacity of the image data buffer 742 can be allotted to many block rows, wherefore it is not necessary to increase the storage capacity of the image data buffer 742 very much. Instead, the image data may be read up to the tail end of the block row without restricting the data length. By doing so, all the data of one block row can be read in one readout and saved in the image data buffer 742 in addition to avoiding the duplication of the data as described above. Thus, the processing time in the succeeding data processing can be shortened by reducing the number of accesses to the memory card M. However, since the image data buffer 742 needs to have a large storage capacity to save all the data of one block row, this method is preferably applied, for example, in the case where the storage capacity of the buffer has sufficient room.

Further, the decoder 75 specifies from where to where the image data included in the image file are to be read by specifying the offset values, but the leading one of the specified image data is not necessarily the leading one of a series of image data representing one block row. In other words, there are cases where the data are read from an intermediate one of a series of image data representing one block row. Even in such a case, it can be avoided to doubly read the data by reading the data from the one at the read starting position to the one at the tail end of the image data representing this block row and preventing the read data from being included in the next block row.

In this way, in the pre-reading processing of this embodiment, the data size of the image file and whether or not to rotate the image are judged based on the result of the preview preparation processing, and the image data are read from the memory card M and saved in the image data buffer 742 in the mode based on this judgment without waiting for an instruction operation from the user. Therefore, the next processing can be performed without delay in response to an instruction operation from the user.

Figure 11:
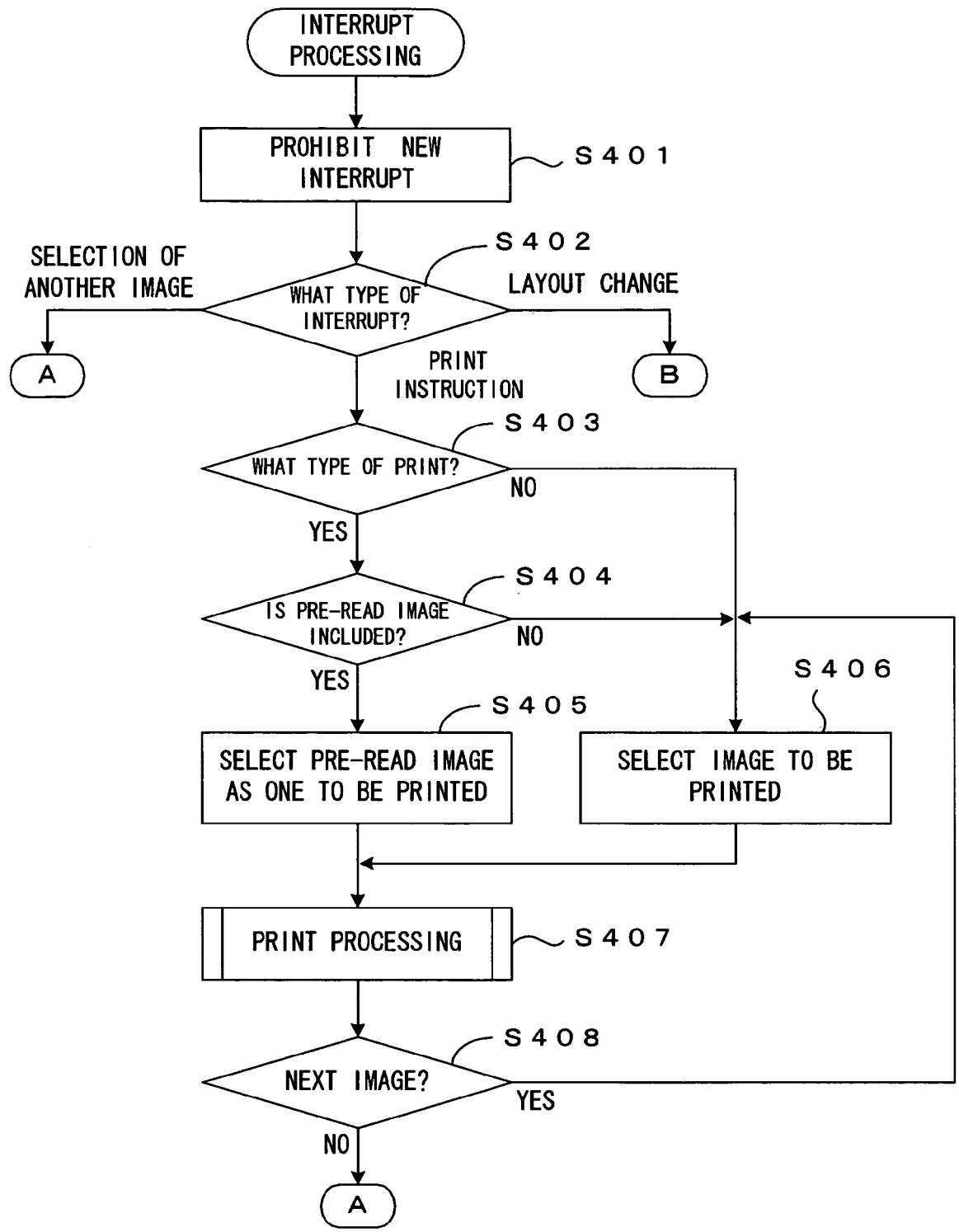
FIG. 11 is a flow chart showing an interrupt processing based on an instruction operation of the user.

FIG. 11 is a flow chart showing an interrupt processing based on an instruction operation of the user. If a certain instruction operation is given from the user by means of the button group 24 with interrupt enabled, the interrupt processing shown in FIG. 11 is performed. In the interrupt processing, new interrupt is prohibited (Step S401) until this interrupt processing is completed. As shown in FIG. 7, interrupt is received even during the execution of the above pre-reading processing since interrupt reception is permitted immediately before the pre-reading process. The reason for this will be described later.

Subsequently, the type of the interrupt is discriminated (Step S402). If the instruction operation of the user is to select another image, a jump is made to "A" of FIG. 7 to perform a processing such as the above preview display for the newly selected image. If the instruction operation from the user relates to a layout change such as a printing direction of the image or the allotment of images, a jump is made to "B" of FIG. 7 to perform the above pre-reading processing. At this time, whether or not to rotate the image is judged based on the newly specified layout.

If the instruction operation of the user is to instruct the printing, the following operation is performed. First of all, whether a single type of images or a plurality of types of images are instructed to be printed is judged (Step S403). Here, not the number of images to be printed, but the types thereof are judged. Accordingly, in the case of printing a plurality of copies of the same image, a single type of images are printed. If there are a plurality of types of images, it is judged whether or not these images include the one for which the pre-reading processing was already finished or is being performed (Step S404). If there is the image for which the pre-reading processing was already finished or is being performed, this image is selected as the one to be printed (Step S405) and the printing processing is performed for this image (Step S407). On the other hand, if the single type of the image is to be printed, this image is selected as the one to be printed, or if the plurality of types of images include no image for which the pre-reading processing was already finished or is being performed, one arbitrary image (e.g. the one first selected by the user or the first one in the arrangement of the image file in the memory card M) is selected as the one to be printed (Step S406) and the printing processing is performed.

Figure 12:
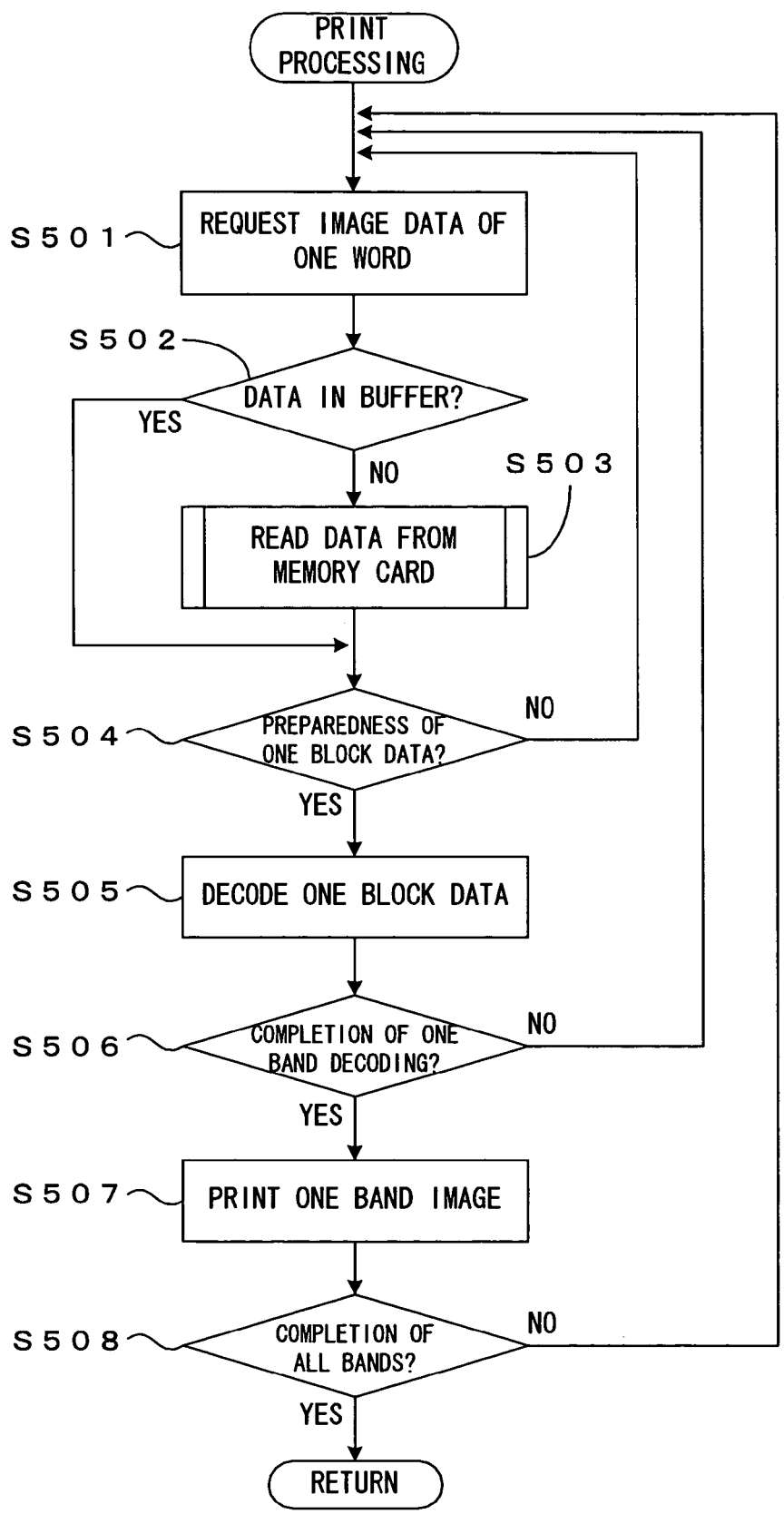
FIG. 12 is a flow chart showing the printing processing.

FIG. 12 is a flow chart showing the printing processing. The schematic flow of the printing processing is such that the decoder 75 receives the image data from the file system 74 and decodes them by the image block, and the print mechanism 50 prints the image of one band on a sheet P when the decoding processing of one band is completed. This is repeated for all the bands. This will be described in more detail.

The decoder 75 starts decoding the first image block in the scanning direction of the carriage 53 and moves the image blocks to be processed in an order of the carriage scanning direction and the sheet feeding direction. Specifically, the image data of one word from the leading end of the image block to be first decoded is requested to the file system 74 (Step S501). The file system 74 judges whether or not this data is already saved in the image data buffer 742 (Step S502). The data is read and fed to the decoder 75 if being saved in the image data buffer 742, whereas access is made to the memory card M to read necessary data (Step S503) if being not saved therein. The data readout here can be the same as the one described above. In other words, in the case of printing the image while rotating it, the processing of Steps S311 to S316 of FIG. 10 can be applied. In the case of not rotating the image, Steps S303 to S305 of FIG. 10 can be applied.

The decoder 75 repeats the data request to the file system 74 until the image data of one block are prepared (Step S504), decodes the image data of one block when these data are prepared (Step S505) and feeds the decoded data to the print data generator 76. When the decoding processing of one band is completed (Step S506), the print data generator 76 feeds the print data of one band to the print mechanism 50 and the print mechanism 50 prints the image of this band (Step S507). By repeating the above processing for all the bands (Step S508), one image can be entirely printed.

Referring back to FIG. 11, the interrupt processing is further described. Upon completing the printing of one image as above (Step S407), whether or not there are the next images to be printed is judged (Step S408). If there are the next images, one of them is set as the one to be printed next (Step S406) and the above printing processing is repeated. On the other hand, if there is no next image, a jump is made to "A" of FIG. 7, one image file is selected anew and the processing is arbitrarily performed for this image file.

Next, the reason for receiving an interrupt processing based on a user instruction operation even during the execution of the pre-reading process will be described. In the pre-reading processing of this embodiment, the image data are read from the memory card M and written and saved in the image data buffer 742 without waiting for an operation instruction from the user. At this time, the data reading order is judged based on the data size of the image file and whether or not to rotate the image (FIG. 10). This judgment is made so that the reading order is corresponding to the mode (e.g. whether or not to rotate) predicted to have a "high possibility of being finally selected by the user" based on the present status of the image file, but the user may possibly select a mode different from this. It is not meaningless that the apparatus continues to perform the processing in the mode contrary to the one selected and instructed by the user himself. Furthermore, it also amiss since a response to the user's instruction is delayed.

Accordingly, in this embodiment, an interrupt input resulting from a user operation is received even during the execution of the pre-reading processing in order to stop the processing being executed and immediately perform the operation corresponding to the user's instruction when an instruction is given from the user while performing the pre-reading processing in the mode having a high possibility of being instructed prior to the user's instruction.

For example, if an operation instruction is given from the user while the rotation of the image is judged (Step S302 of FIG. 10) in the pre-reading processing and the data are written in the line buffers #1, #2, . . . in such an order as shown in FIG. 6B, the pre-reading processing is stopped at that point of time to perform an interrupt processing (FIG. 11). At this time, if the operation instruction relates to the selected image or a layout change, the succeeding processing is performed in the mode based on the state after the change. If the user, for example, gave an operation instruction to the effect of "not rotating the image", the routine proceeds to "B" of FIG. 7 from Step S402 of FIG. 11, the pre-reading processing in conformity with the mode of "not rotating" (Step S109 of FIG. 7) is performed and the image data are overwritten in the respective line buffers in the order shown in FIG. 5B. Further, if the user, for example, selected another image file, the routine proceeds to "A" of FIG. 7 from Step S402 of FIG. 11 to start a series of processings for the newly selected image file.

As described above, in this embodiment, the image data are read and written in the image data buffer 742 prior to the user's instruction, but every time a new material for judging the data reading order is given by the user's instruction, the data reading order is judged again and the data are read and saved in the image data buffer 742 in the order conforming to the judgment result. Thus, when the image to be printed and its layout are confirmed and instructed to be printed by the user, the image data are already written in the image data buffer 742 in most cases and the printing operation can be immediately performed.

If another image is selected or the layout is changed, the image data read by the pre-reading process are wasted without being used, but this does not impair user convenience. The pre-reading processing is performed during a standby period, so to speak, until the user's instruction is given, and is immediately stopped to perform the processing corresponding to the instruction if any instruction is given from the user.

If the operation instruction from the user is a print instruction, whether or not there are any data already read and written in the image data buffer 742 is judged and, if there are some, the printing is performed, preferentially using them (Steps 404, S405 of FIG. 11). Thus, the data read in the pre-reading processing are not wasted. Since the readout of the image data is already in progress when the print instruction is given, the image corresponding to the instruction can be more quickly printed as compared with the conventional technology for starting the readout after receiving an instruction.

As described above, in this embodiment, when the memory card M is inserted into the memory card slot 16 or the user instructs to change the selected image or to change the layout, the data readout from the memory card M is started without waiting for a print instruction from the user and the read image data are saved in the image data buffer 742. At this time, the reading order from the memory card M and the writing order in the line buffers are determined based on the content of the image file or the data request order from the decoder 75 predicted from the content of the user's instruction. Thus, the data are saved in the image data buffer 742 in the order suitable for the mode thought to have a high possibility of being finally selected. Therefore, if a print instruction is given from the user after the above operation, the printing operation can be immediately started using the data saved in the image data buffer 742 and the processing time required for the printing can be shortened.

If the image data need to be read in an order different from the arrangement order of the image data in the memory card M, for example, as in the case of rotating the image, the data straddling two or more block rows are not read in one read access. More specifically, if the data length from the leading end data where the readout is started to the tail end of the image data (tail end data) belonging to the same block row is shorter than the buffer size of the line buffer, only the image data from the leading end data to the tail end data are read. By doing so, there is no likelihood of doubly reading the same data from the memory card M and saving it in the image data buffer 742. Thus, the storage capacity of the image data buffer 742 can be efficiently utilized by eliminating waste of time required for the readout of the duplicated data.

If the image data are variable-length data, it is difficult to find out a delimiter for each block row in the image data string in the memory card M since the data length of the image data representing one block row is not fixed. However, in this embodiment the boundary information, representing the delimiters of the respective block rows, obtained by the processing for the preview display to let the user confirm the image content stored in the memory card M is saved, and the tail ends of the block rows are identified based on this information. Therefore, the data readout can be simply and reliably stopped at the tail end data of the block rows.

Since the derivation of the boundary information and the pre-reading of the data based on the boundary information are started without waiting for a print instruction from the user, the generation of print data and the printing operation can be quickly performed in the case of the print instruction. In this case, it goes without saying that the generation of print data can be immediately started if the data readout from the memory card M and the writing in the image data buffer 742 are completed before the print instruction, but an effect of shortening the processing time can be obtained if at least boundary information is already obtained when the print instruction is given. The reason for this is as follows.

In the conventional technology, a processing of deriving the boundary information has been performed after receiving a print instruction. Thus, if it is necessary to rotate an image, data are first read in an arrangement order in a memory card to generate boundary information upon receiving a print instruction, and then reads the image data again in an order based on the boundary information to generate print data. In contrast, if the boundary information is obtained without waiting for the print instruction, the data readout in the arrangement order in the memory card when the print instruction is received and the generation of the boundary information can be omitted. Therefore, time required for the processing can be shortened as compared to the conventional technology.

Although the processing is performed by the "image block" in the above embodiment, this "image block" corresponds to one or a plurality of "MCUs (Minimum Coded Units)" in the JPEG format. In other words, if an image file to be handled is of the JPEG format, the image block in this embodiment can be thought to be equivalent to one or a plurality of MCUs consecutive in the X-direction.

Figure 13:
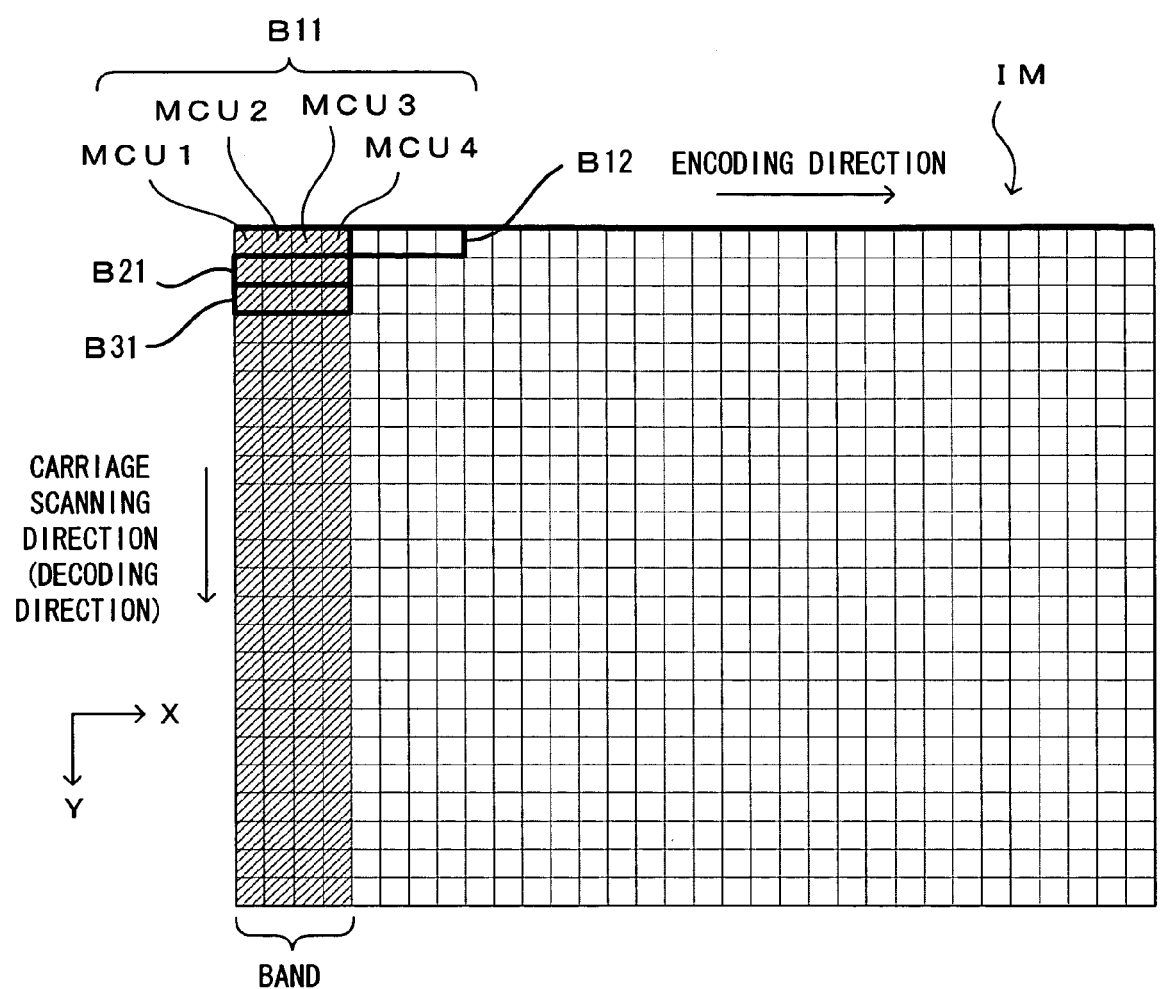
FIG. 13 is a diagram showing an image block made up of a plurality of MCUs.

FIG. 13 is a diagram showing an image block made up of a plurality of MCUs. An image IM encoded in the JPEG format is coded from the left upper corner to right and to down by the MCU. One band has a width of four MCUs. In such a case, four MCUs (MCU1, MCU2, MCU3 and MUC4) consecutive in the X-direction can correspond to one image block B11. Accordingly, image data D11 representing the image block B11 includes all the image data obtained by individually encoding the four MCUs of MCU1, MCU2, MCU3 and MUC4. Similarly, each of other blocks B12, B21, B31, etc. can correspond to four MCUs consecutive in the X-direction.

If such an image is printed while being rotated by 270°, the decoding processing is performed in an order of the blocks B11, B21, B31, ... along the carriage scanning direction, i.e. Y-direction. Further, the decoding processing of the respective blocks is performed by the MCU in the arrangement order in the X-direction. For example, the image block B11 is decoded in an order of MCU1, MCU2, MCU3 and MUC4. Thus, the "boundary information" shown in FIG. 9 corresponds to the offsets of the respective MCUs at the left ends of the respective rows.

In the embodiment described above, the memory card controller 72, the memory card driver 73 and the file system 74 function together as a "reader" of the invention. Further, any of the decoder 75, the print data generator 76 and the LCD controller 77 functions as a "data processor" of the invention, whereas the image data buffer 742 functions as a "storage" of the invention. Furthermore, the memory card M corresponds to a "storage medium". The print mechanism 50 and the LCD screen 22 respectively function as a "printing unit" and a "display unit" of the invention.

In the above embodiment, the preview preparation processing (FIG. 8) corresponds to a "first reading processing" and a "boundary information derivation processing" of the invention. More specifically, in the preview preparation processing, the processing of reading the image data of a specified size from the memory card M and saving them in the image data buffer 742 (Steps S204, S205) corresponds to the "first reading processing", whereas the processing of saving the offsets for the respective block rows (Steps S209, S210 and S201) corresponds to the "boundary information derivation processing". Further, Steps S311 to S316 of the pre-reading processing (FIG. 10) correspond to a "second reading processing" of the invention. In a series of processings of FIGS. 7, 8 and 10, the processing performed when Steps S303 and subsequent Steps of FIG. 10 are selected corresponds to a "first processing mode" of the invention, and the processing performed when Steps S311 and subsequent Steps of FIG. 10 are selected corresponds to a "second processing mode" of the invention.

In the image file (FIG. 4) used in the description of the above embodiment, out of the image encoding directions, the X-direction (horizontal direction, row direction) corresponds to a "main scanning direction" of the invention, whereas the Y-direction (vertical direction, column direction) corresponds to a "sub scanning direction" of the invention.

The invention is not limited to the above embodiments and various changes other than the above can be made without departing from the gist thereof. For example, the image file stored in the memory card M in JPEG format is read and applied the data processing, but the format of the image file is not restricted to the JPEG format and the invention can be applied to an apparatus which handles the image file in TIFF (Tagged Image File Format), bitmap format or the like. Particularly, in a case where the image content thereof is in the data format representing as the variable-length data, the effect of the invention is brought to the fore.

In the above embodiment, the "boundary information" on one selected image file is saved in the administrative information buffer 741 provided in the controller 70. Instead, the boundary information on a plurality of image files may be saved by increasing the capacity of the administrative information buffer 741. By doing so, as in the case where the image file for which the boundary information was obtained is, for example, selected again after being excluded from objects to be selected, it is not necessary to obtain the boundary information anew. Thus, this is preferable in light of shortening the processing time. In this case, the boundary information on the image file may be deleted when the memory card M storing this image file is taken out of the memory card slot 16 or when another memory card is mounted.

Although image files stored in the memory card insertable into and detachable from the apparatus body are read in the above respective embodiment, various storage media other than such a card-type one can be used as the "storage medium" of the invention. For example, it may be a storage medium including a magnetic disc or a stick-type storage medium. Further, a device having a function of storing image files including captured images such as a digital camera or a mobile phone and enabling the image files to be read via cable, radio or infrared communication n can also be used as the "storage medium" of the invention.

Although the print mechanism 50 is an ink-jet printer in the above embodiments, it may be an electrophotographic printer. Further, although the LCD screen 22 in the above embodiments displays images using an LCD display, it may display images by another display method such as an EL (electroluminescent device) display.

Although the invention is applied to the photo printer having the display function of displaying an image corresponding to an image file and the print function of printing the image in the above embodiments, the application object of the invention is not limited to the above photo printer. For example, the invention is also applicable to devices having only either one of the display function and the print function. Further, without being limited to apparatuses having such display and/or print functions, the invention is applicable to data processing apparatuses and data processing methods in general for reading an image file stored in a storage medium and applying a data processing thereto.

As in the case where the order of the data requested by the data processor coincides with the arrangement order in the storage medium, the image data saved in the storage in the order based on the boundary information as described above could not possibly be effectively utilized. In this case, it is necessary to read the image data again. However, the readout at this time is a simple one in conformity with the arrangement order in the storage medium, wherefore time loss caused by the rereading is relatively short.

It is desirable to save the boundary information until the second reading processing is completed, but whether or not the image data read in the first reading processing are saved in the storage is optional. Since the image data are read in the arrangement order in the storage medium in the first reading processing, if these image data are saved, it is preferable because the data processing can be started using the saved data, for example, when the order of the data requested by the data processor coincides with the arrangement order in the storage medium. However, if it is tried to save the data read in both first and second reading processings, the storage needs to have a large storage capacity and it cannot be said to be efficient since one of the data is not used for the data processing. Accordingly, it is preferable to temporarily save the read image data in the storage in the first reading processing and to write the image data read in the second reading processing over the data in the storage medium.

The image data processing apparatus constructed as above may further comprise a display unit for display an image corresponding to the image file based on display data, and the data processor may generate the display data based on the image data read in the first reading processing and feed them to the display unit. By doing so, the user can confirm the image by the eyes prior to the printing. Further, the image data read by the first reading processing are used for two purposes, i.e. one for generating the display data and the other for obtaining the boundary information, wherefore the efficiency of the data processing can be further improved. If the second reading processing proceeds while the image is displayed in this way, the printing can be started without delay when the user having confirmed the image operates to give a print instruction.

Further, a first processing mode for performing the first reading processing, the boundary information derivation processing and the second reading processing in this order and a second processing mode for reading the image data in the arrangement order from the storage medium and saving them in the storage may be selectively executed. By doing so, the order of the image data to be read from the storage medium and saved in the storage beforehand can be set to either the same order as the arrangement order in the storage medium or an order different therefrom, and time required for the data processing can be shortened by reading necessary image data from the storage medium and saving them in the storage beforehand.

One of the first and second processing modes may be selectively executed, for example, based on information representing the size of the image included in the image file. Further, one of the first and second processing modes may be selectively executed, for example, based on information relating to the image arrangement on the recording material specified by the user. The dimensions and shape (vertically long or horizontally long) of the image can be known from the size of the image, e.g. the numbers of pixels in vertical and horizontal directions of the image. If the arrangement of the image is determined, it is determined in which of the vertical and horizontal directions of the image the processing for generating the print data is performed. These pieces of information can be indices for predicting the order of image data required for the data processing. Accordingly, by selecting the processing mode based on these pieces of information, the image data can be saved in the storage in an order having a high probability of being actually requested by the data processor. More specifically, the second processing mode may be selected when the order of the image data requested by the data processor coincides with the arrangement order of the image data in the storage medium, whereas the first processing mode may be selected when these orders differ.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image data processing apparatus, comprising:
a reader that reads image data included an image file from an external storage medium, the image data being variable-length coded data of image blocks obtained by dividing an image in a main scanning direction and a sub scanning direction and arranged in an order of the main scanning direction and the sub scanning direction;
a storage that temporarily saves the image data read by the reader;
a printing unit that prints the image corresponding to the image file on a recording material based on print data in response to a print instruction from a user; and
a data processor that requests image data to the reader and performs a specified data processing to the image data fed from the reader in response to the request to generate the print data,
wherein:
the reader performs a first reading processing for reading the image data in an arrangement order thereof from the storage medium and the data processor performs a boundary information derivation processing based on the image data for obtaining boundary information representing a boundary in a data arrangement in the storage medium between the image data belonging to two image blocks located adjacent in the data arrangement in the storage medium and at mutually different positions in the sub scanning direction, whereas the reader performs a second reading processing for reading the image data from the storage medium in an order determined based on the boundary information and saving them in the storage; and
at least one of the boundary information derivation processing and the second reading processing is started before receiving the print instruction from the user.

2. The image data processing apparatus according to claim 1, further comprising a display unit that displays an image corresponding to the image file based on display data,
wherein the data processor generates the display data based on the data read in the first reading processing and supplies the generated display data to the display unit.

3. The image data processing apparatus according to claim 1, wherein a first processing mode for performing the first reading processing, the boundary information derivation processing and the second reading processing in this order and a second processing mode for reading the image data in the arrangement order from the storage medium and saving them in the storage are selectively executed.

4. The image data processing apparatus according to claim 3, wherein one of the first and second processing modes is selectively executed based on information representing the size of the image included in the image file.

5. The image data processing apparatus according to claim 3, wherein one of the first and second processing modes is selectively executed based on information relating to the image arrangement on the recording material specified by the user.

6. The image data processing apparatus according to claim 3, wherein:
the data processor requests the image data to the reader in an order corresponding to a printing order by the printing unit; and
the second processing mode is selected when the order of the image data requested by the data processor coincides with the arrangement order of the image data in the storage means, whereas the first processing mode is selected when these orders differ.

7. An image data processing method comprising:
generating print data from image data stored in a storage medium and printing an image on a recording material based on the print data in response to a print instruction from a user;
a first reading processing for reading image data included an image file in an arrangement order thereof from the storage medium storing, the image data being variable-length coded data of image blocks obtained by dividing an image in a main scanning direction and a sub scanning direction and arranged in an order of the main scanning direction and the sub scanning direction;
a boundary information derivation processing for obtaining boundary information representing a boundary in a data arrangement in the storage medium between the image data belonging to two image blocks located adjacent in the data arrangement in the storage medium and at mutually different positions in the sub scanning direction based on the image data read in the first reading processing; and
a second reading processing for reading the image data from the storage medium in an order determined based on the boundary information and saving them in the storage,
wherein at least one of the boundary information derivation processing and the second reading processing is started before receiving the print instruction from the user.

* * * * *